(12) United States Patent
Caudle et al.

(10) Patent No.: US 7,722,845 B2
(45) Date of Patent: May 25, 2010

(54) BIFUNCTIONAL CATALYSTS FOR SELECTIVE AMMONIA OXIDATION

(75) Inventors: Matthew T. Caudle, Hamilton, NJ (US); Martin Deiterle, Jersey City, NJ (US); Stanley A. Roth, Yardley, PA (US); Wen-Mei Xue, Dayton, NJ (US)

(73) Assignee: Basf Corporation, Florham Park, NJ (US)

(*) Notice: Subject to any disclaimer, the term of this patent is extended or adjusted under 35 U.S.C. 154(b) by 29 days.

(21) Appl. No.: 12/038,459

(22) Filed: Feb. 27, 2008

(65) Prior Publication Data
US 2008/0292519 A1 Nov. 27, 2008

Related U.S. Application Data

(60) Provisional application No. 60/891,835, filed on Feb. 27, 2007.

(51) Int. Cl.
B01D 53/56 (2006.01)
B01D 53/58 (2006.01)
B01D 53/86 (2006.01)
B01D 53/94 (2006.01)
B01J 23/00 (2006.01)
B01J 23/42 (2006.01)
F01N 3/10 (2006.01)

(52) U.S. Cl. ......... 423/239.1; 423/213.2; 423/213.5; 423/213.7; 423/239.2; 423/237; 502/300; 502/353; 502/305; 502/324; 502/325; 502/344; 502/340; 60/299; 60/301; 60/302; 422/168; 422/169; 422/170; 422/177; 422/180

(58) Field of Classification Search ......... 423/213.2, 423/213.5, 213.7, 239.2, 237; 502/300, 353, 502/305, 324, 325, 344, 340; 60/299, 301, 60/302; 422/168, 169, 170, 177, 180
See application file for complete search history.

(56) References Cited

U.S. PATENT DOCUMENTS 4,220,632 A 9/1980 Pence et al.

(Continued)

FOREIGN PATENT DOCUMENTS

DE 3941541 A1 6/1990

(Continued)

OTHER PUBLICATIONS

Li, Yuejin et al., "Selective NH3 Oxidation to N2 in a Wet Stream", *Applied Catalysis B: Environmental 13*, (1997), p. 131-139.

(Continued)

*Primary Examiner*—Timothy C Vanoy
(74) *Attorney, Agent, or Firm*—Scott S. Servilla; Diehl Servilla LLC; Melanie L. Brown

(57) ABSTRACT

Catalysts, methods, and systems for treating diesel engine exhaust streams are described. In one or more embodiments, the catalyst comprises platinum, a second metal from one of the groups VB, VIB, VIIB, VIIIB, IB, or IIB of the periodic table, a refractory metal oxide, and a zeolite, the oxidation catalyst already being effective to remove ammonia at temperatures less than about 300° C. and exhibiting no significant decrease in ammonia oxidation efficiency upon hydrothermal aging. A method aspect includes first passing a vehicle's engine exhaust stream through a $NO_x$ abatement catalyst; and passing the exhaust stream exiting the $NO_x$ abatement catalyst and containing ammonia through the ammonia oxidation catalyst. Systems including such catalysts are also provided.

33 Claims, 4 Drawing Sheets

U.S. PATENT DOCUMENTS

| | | | |
|---|---|---|---|
| 4,440,871 A | | 4/1984 | Lok et al. |
| 4,735,927 A | | 4/1988 | Gerdes et al. |
| 4,735,930 A | | 4/1988 | Gerdes et al. |
| 4,961,917 A | | 10/1990 | Byrne |
| 5,041,270 A | | 8/1991 | Fujitani et al. |
| 5,313,792 A | * | 5/1994 | Katoh et al. ............... 60/301 |
| 5,417,949 A | | 5/1995 | McWilliams et al. |
| 5,516,497 A | | 5/1996 | Speronello et al. |
| 5,589,147 A | | 12/1996 | Farnos et al. |
| 5,589,149 A | | 12/1996 | Garland et al. |
| 6,171,556 B1 | | 1/2001 | Burk et al. |
| 6,376,562 B1 | | 4/2002 | Ihm et al. |
| 6,569,394 B2 | | 5/2003 | Fischer et al. |
| 6,606,856 B1 | * | 8/2003 | Brown et al. ............... 60/299 |
| 6,709,644 B2 | | 3/2004 | Zones et al. |
| 7,049,261 B2 | | 5/2006 | Nam et al. |
| 7,229,597 B2 | | 6/2007 | Patchett et al. |
| 2001/0038812 A1 | * | 11/2001 | Yavuz et al. ............. 423/213.2 |
| 2001/0043896 A1 | * | 11/2001 | Domesle et al. .......... 423/213.5 |
| 2004/0209760 A1 | | 10/2004 | Yoshikawa |
| 2005/0031514 A1 | | 2/2005 | Patchett et al. |
| 2006/0039843 A1 | | 2/2006 | Patchett et al. |
| 2006/0115403 A1 | | 6/2006 | Yuen |
| 2007/0000243 A1 | | 1/2007 | Liu et al. |
| 2007/0149385 A1 | | 6/2007 | Liu et al. |
| 2009/0060809 A1 | * | 3/2009 | Shioya et al. ............... 423/237 |

FOREIGN PATENT DOCUMENTS

| | | |
|---|---|---|
| DE | 10059520 | 5/2001 |
| EP | 0773057 A1 | 5/1997 |
| EP | 1992409 A1 | 11/2008 |
| JP | 05-057194 | 9/1994 |
| WO | WO-2007/004774 A1 | 1/2007 |

OTHER PUBLICATIONS

Rebrov, E. V., et al., "Development of the Kinetic Model of Platinum Catalyzed Ammonia Oxidation in a Microreactor", *Chemical Engineering Journal 90*, (2002), p. 61-76.

Baerlocher, CH. et al., "Atlas of Zeolite Framework Types", Elsevier—Fifth Revised Edition, (2001), 5 pages.

Medros, F. G., et al., "Dual-Catalyst System to Broaden the Window of Operability in the Reduction of NOx with Ammonia", *Ind. Eng. Chem. Res. 28*, (1989), p. 1171-1177.

Akolekar, Deepak B., et al., "FTIR Investigations of the Absorption and Disproportionation of NO on Cu-Exchanged Silicoaluminophosphate of Type 34", *J. Chem. Soc., Faraday Trans.*, 94(1), (1998), p. 155-160.

Torre-Abreu, C. et al., "Selective Catalytic Reduction of NO on Copper-Exchanged Zeolites: The Role of the Structure of the Zeolite in the Nature of Copper-Active Sites", *Catalysis Today 54*, (1999), p. 407-418.

PCT International Search Report and Written Opinion in PCT/US2009/032610, Jul. 16, 2009, 20 pgs.

Machine Translation from EPO of DE 394541 A1, 8 pgs, Jun. 28, 1990.

PCT International Search Report for PCT/US2008/055148, 7 pp., Oct. 20, 2008.

PCT Written Opinion for PCT/US2008/055148, 6 pp., Oct. 20, 2008.

Zelenka, P. et al., "Exhaust gas aftetreatment systems for diesel engines with respect to future emission legislation", *Diesel Engine Technology 96*, (May 1993) 13 pgs.

* cited by examiner

BIFUNCTIONAL CATALYSTS FOR SELECTIVE AMMONIA OXIDATION

CROSS-REFERENCE TO RELATED APPLICATIONS

This application claims the benefit of priority under 35 U.S.C. §119(e) to U.S. Patent Application No. 60/891,835, filed Feb. 27, 2007, which is hereby incorporated by reference in its entirety.

TECHNICAL FIELD

Exhaust emissions treatment systems and catalysts for internal combustion engines and methods for their manufacture and use with lean burn engines, including diesel engines and lean burn gasoline engines, are disclosed.

BACKGROUND

Diesel engine exhaust is a heterogeneous mixture which contains not only gaseous emissions such as carbon monoxide ("CO"), unburned or partially burned hydrocarbons or oxygenates thereof ("HC") and nitrogen oxides ("$NO_x$"), but also condensed phase materials (liquids and solids) which constitute the so-called particulates or particulate matter. Often, catalyst compositions and substrates on which the compositions are disposed are provided in diesel engine exhaust systems to convert certain or all of these exhaust components to innocuous components. For example, diesel exhaust systems can contain one or more of a diesel oxidation catalyst, a soot filter and a catalyst for the abatement of $NO_x$.

A proven $NO_x$ abatement technology applied to stationary sources with lean exhaust conditions is ammonia Selective Catalytic Reduction (SCR). In this process, $NO_x$ (=$NO+NO_2$) is reacted with ammonia to form dinitrogen ($N_2$) over a catalyst typically composed of base metals. This technology is capable of $NO_x$ reduction greater than 90%, and thus it represents one of the best approaches for achieving aggressive $NO_x$ abatement goals. SCR provides efficient conversions of $NO_x$ as long as the exhaust temperature is within the active temperature range of the catalyst.

Reduction of $NO_x$ species to $N_2$ using $NH_3$ is of interest for meeting $NO_x$ emission targets in lean burn engines. A consequence of using $NH_3$ as a reductant is that under conditions of incomplete conversion or exhaust temperature upswings, $NH_3$ can slip from the exhaust of the vehicle. To avoid slippage of $NH_3$, a sub-stoichiometric quantity of $NH_3$ can be injected into the exhaust stream, but there will be decreased $NO_x$ conversion. Alternatively, the $NH_3$ can be overdosed into the system to increase $NO_x$ conversion rate, but the exhaust then needs to be further treated to remove excess or slipped $NH_3$. Even at a substoichiometric dosage of $NH_3$, an increase in exhaust temperature may release ammonia stored on the $NO_x$ abatement catalyst, giving an $NH_3$ slip. Conventional precious-metal based oxidation catalysts such as platinum supported on alumina can be very efficient at $NH_3$ removal, but they produce considerable $N_2O$ and $NO_x$ as undesired side products instead of the desired $N_2$ product. Thus, there is a need for a catalyst composition that is active for $NH_3$ oxidation at temperatures as low as 225° C. and that has $N_2$ selectivity in excess of about 60% between 250° C. and 400° C.

There is also a need for ammonia oxidation catalysts that are stable against the long term thermal, chemical, and physical stress of normal vehicle operation, which includes temperatures up to about 450° C. for a typical diesel application. In addition, a vehicle exhaust system may operate for short periods at temperatures above 800° C., for example during the thermal regeneration of a particulate filter. It is important that an ammonia oxidation catalyst be stable to these acute thermal stressors as well. For this reason, accelerated aging conditions are identified that mimics the cumulative effects of these long-term and acute stressors on the catalyst activity. Such an aging condition involves exposure of the catalyst to temperatures of 700° C. to 800° C. for between 5 and 50 hrs in the presence of up to about 10% water vapor in air.

SUMMARY

Aspects of the invention pertain to catalysts, methods, and systems for treating exhaust gas. According to one or more embodiments of the invention, methods for treating emissions produced in the exhaust gas stream of a diesel vehicle are provided. A vehicle's engine exhaust stream is passed through a $NO_x$ abatement catalyst. The exhaust stream exiting the $NO_x$ abatement catalyst, which may contain ammonia, is passed through an oxidation catalyst. The oxidation catalyst comprises platinum, a second metal from one of the groups VB, VIIB, VIIB, VIIIB, IB, or IIB of the periodic table, a refractory metal oxide, and a zeolite. The oxidation catalyst may be effective to remove ammonia at temperatures below about 300° C., preferably below 250° C. The oxidation catalyst may exhibit no significant decrease in ammonia removal efficiency upon hydrothermal aging. According to one or more embodiments, hydrothermal aging refers to aging of a catalyst at temperatures up to about 700° C., specifically up to about 800° C., for up to 50 hrs, for example, from about 5 to about 25 hours, in the presence of about 10% water vapor in air.

Other embodiments of the invention are directed to catalysts for oxidizing ammonia. The catalyst comprises two distinct materials having complementary function: A platinum component supported on a refractory metal oxide or zeolite; and a zeolite onto which a second metal, from one of the groups VB, VIIB, VIIB, VIIIB, IB, or IIB of the periodic table, is supported. The second metal may be present on the zeolite as metal cations associated with ion-exchange sites on the zeolite framework. The supported platinum component provides a highly active and thermally stable ammonia oxidation function. The second metal supported on zeolite provides an additional path for consumption of $NH_3$ and $NO_x$ by the selective catalytic reduction reaction, which serves to increase the selectivity of the catalyst to $N_2$ production. The metal/zeolite component may also be designed to decompose $N_2O$, produced by the oxidation of $NH_3$ by the platinum/refractory metal oxide component at low temperatures, to $N_2$, further improving the $N_2$ selectivity. The oxidation catalyst may be effective to remove ammonia at temperatures below about 300° C., preferably below 250° C. The oxidation catalyst may exhibit no significant decrease in ammonia removal efficiency upon hydrothermal aging at temperatures up to about 700° C. According to one or more embodiments, the second metal is copper, present as copper(II) ions associated with ion-exchange sites on the zeolite.

Further embodiments of the invention are directed to treatment systems for an exhaust stream containing $NO_x$. The treatment system comprises an upstream catalyst being effective for decreasing $NO_x$; and a downstream oxidation catalyst being effective for oxidizing ammonia. The oxidation catalyst comprises platinum, a second metal from one of the groups VB, VIIB, VIIB, VIIIB, IB, or IIB of the periodic table, a refractory metal oxide, and a zeolite. The oxidation catalyst may be effective to remove ammonia at temperatures below about 300° C., preferably below 250° C. The oxidation catalyst may exhibit no significant decrease in ammonia removal efficiency upon hydrothermal aging.

According to one or more embodiments, the catalysts used in the methods or systems the $NO_x$ abatement catalyst comprises an SCR catalyst, an LNT catalyst, or other catalyst for the destruction of $NO_x$ that results in slippage of ammonia from the $NO_x$ abatement catalyst. In one or more embodiments, the $NO_x$ abatement catalyst and oxidation catalyst compositions are disposed on separate substrates. In other embodiments, the $NO_x$ abatement catalyst and the oxidation catalyst are disposed on the same substrate.

In one or more embodiments, platinum is distributed on the refractory metal oxide. The platinum may also be distributed on the zeolite. In one or more embodiments, the platinum is present in an amount in the range of about 0.1 g/ft$^3$ to about 10 g/ft$^3$, based on total catalyst volume.

In one or more embodiments, the metal from one of the groups VB, VIIB, VIIB, VIIIB, IB, or IIB of the periodic table is distributed on the zeolite. The metal may be distributed on the zeolite in an amount between 0.1% and 5% by wt of zeolite. In specific embodiments, the metal is copper or iron, or a mixture of both.

According to one or more embodiments, the refractory metal oxide is selected from alumina, silica, zirconia, titania, ceria, and physical mixtures or chemical combinations thereof, including atomically doped combinations. In certain embodiments, the total loading of the refractory metal oxide support on the substrate is between about 0.01 g/in$^3$ and 2.0 g/in$^3$, based on total catalyst volume. In one or more embodiments, the zeolite has one of the following crystal structures: CHA, BEA, FAU, MOR, MFI. In one embodiment, the mole ratio of silica to alumina in the zeolite is from about 2 to about 250. In specific embodiments, the total loading of the zeolite on the substrate is between about 0.1 g/in$^3$ and 4.0 g/in$^3$, based on total catalyst volume.

DETAILED DESCRIPTION

Figure 1:
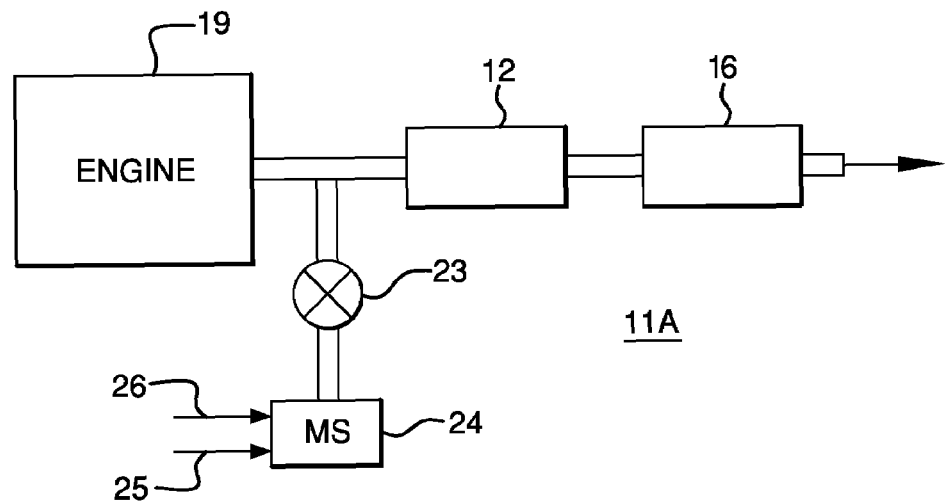
FIG. 1 shows a schematic depiction of an embodiment of an emission treatment system.

Before describing several exemplary embodiments of the invention, it is to be understood that the invention is not limited to the details of construction or process steps set forth in the following description. The invention is capable of other embodiments and of being practiced or being carried out in various ways.

As used in this specification and the appended claims, the singular forms "a", "an" and "the" include plural referents unless the context clearly indicates otherwise. Thus, for example, reference to "a catalyst" includes a mixture of two or more catalysts, and the like. As used herein, the term "abate" means to decrease in amount and "abatement" means a decrease in the amount, caused by any means. Where they appear herein, the terms "exhaust stream" and "engine exhaust stream" refer to the engine out effluent as well as to the effluent downstream of one or more other catalyst system components including but not limited to a diesel oxidation catalyst and/or soot filter.

According to one or more embodiments of the invention, methods for treating emissions produced in the exhaust gas stream of a lean-burn or diesel vehicle are provided. In one embodiment, a vehicle's engine exhaust stream is passed through a $NO_x$ abatement catalyst. The exhaust stream exiting the $NO_x$ abatement catalyst, which may contain ammonia, is passed through an oxidation catalyst. The oxidation catalyst comprises platinum, a second metal from one of the groups VB, VIIB, VIIB, VIIIB, IB, or IIB of the periodic table, a refractory metal oxide, and a zeolite. The oxidation catalyst may be effective to remove ammonia at temperatures below about 300° C., preferably below 250° C. The oxidation catalyst may exhibit no significant decrease in ammonia removal efficiency upon aging at temperatures up to about 700° C., preferably up to about 800° C., for up to 50 hrs in the presence of about 10% water vapor in air.

The $NO_x$ abatement catalyst of one or more embodiments comprises a selective catalytic reduction (SCR) catalyst, a lean $NO_x$ trap (LNT) catalyst, or other catalyst for the destruction of $NO_x$ that results in a possible emission or slippage of ammonia from the $NO_x$ abatement catalyst.

The $NO_x$ abatement catalyst and oxidation catalyst composition can be disposed as a washcoat layer on the same or separate substrates. Furthermore, the SCR catalyst and the selective ammonia oxidation catalyst may be in the same catalyst housing or may be in different catalyst housings.

Other aspects are directed to catalysts for oxidizing ammonia. In one embodiment, the catalyst comprises two distinct materials having complementary function: A platinum component supported on a refractory metal oxide or zeolite; and a zeolite onto which a second metal, from one of the groups VB, VIIB, VIIB, VIIIB, IB, or IIB of the periodic table, is supported. The second metal may be present on the zeolite as metal cations associated with ion-exchange sites on the zeolite framework. The supported platinum component provides a highly active and thermally stable ammonia oxidation function. The second metal supported on zeolite provides an additional path for consumption of $NH_3$ and $NO_x$ by the selective catalytic reduction reaction, which serves to increase the selectivity of the catalyst to $N_2$ production. The metal/zeolite component may also be designed to decompose $N_2O$, produced by the oxidation of $NH_3$ by the platinum/refractory metal oxide component at low temperatures, to $N_2$, further improving the $N_2$ selectivity. The oxidation catalyst may be effective to remove ammonia at temperatures below about 300° C., preferably below 250° C. The oxidation catalyst may exhibit no significant decrease in ammonia removal efficiency upon aging at temperatures up to about 700° C., preferably up to about 800° C., for up to 50 hrs in the presence of about 10% water vapor in air. According to one or more embodiments, the second metal is copper, present as copper (II) ions associated with ion-exchange sites on the zeolite.

Further embodiments are for treatment systems for an exhaust stream containing $NO_x$. In one embodiment, the treatment system comprises an upstream catalyst being effective for decreasing $NO_x$; and a downstream oxidation catalyst being effective for oxidizing ammonia. The oxidation catalyst comprises platinum, a second metal from one of the groups VB, VIIB, VIIB, VIIIB, IB, or IIB of the periodic table, a refractory metal oxide, and a zeolite. The oxidation catalyst may be effective to remove ammonia at temperatures below about 300° C., preferably below 250° C. The oxidation catalyst may exhibit no significant decrease in ammonia removal efficiency upon aging at temperatures up to about 700° C., preferably up to about 800° C., for up to 50 hrs in the presence of about 10% water vapor in air.

The engine treatment system according to one or more embodiments includes a metering system for metering ammonia, or an ammonia precursor, or a mixture of different ammonia precursors continuously or at periodic intervals into the exhaust stream.

One embodiment of an inventive emission treatment system is schematically depicted in FIG. 1. As can be seen in FIG. 1, the exhaust containing gaseous pollutants (including unburned hydrocarbons, carbon monoxide and $NO_x$) and particulate matter is conveyed through emissions treatment system denoted as 11A. The exhaust, containing gaseous pollutants (including unburned hydrocarbons, carbon monoxide and $NO_x$) and particulate matter, is conveyed from the engine 19 to a position downstream in the exhaust system where a reductant, i.e., ammonia or an ammonia-precursor, is added to the exhaust stream. The reductant is injected as a spray via a nozzle (not shown) into the exhaust stream. Aqueous urea shown on one line 25 can serve as the ammonia precursor which can be mixed with air on another line 26 in a mixing station 24. Valve 23 can be used to meter precise amounts of aqueous urea which are converted in the exhaust stream to ammonia.

The exhaust stream with the added ammonia is conveyed to the SCR catalyst substrate 12 (also referred to herein including the claims as "the first substrate") containing CuCHA in accordance with one or more embodiments. On passing through the first substrate 12, the $NO_x$ component of the exhaust stream is converted through the selective catalytic reduction of $NO_x$ with $NH_3$ to $N_2$ and $H_2O$. In addition, excess $NH_3$ that emerges from the inlet zone can be converted through oxidation by a downstream ammonia oxidation catalyst 16 also containing CuCHA to convert the ammonia to $N_2$ and $H_2O$. The first substrate is typically a flow through monolith substrate. As will be appreciated, after a mixing distance before it enters the SCR catalyst, the radial ammonia concentration perpendicular to the exhaust gas flow may be or may not be uniform. In the SCR catalyst 12, $NO_x$ is converted, with the help of $NH_3$, to $N_2$ and $H_2O$. Residual $NH_3$ slips from the SCR catalyst 12 to an $NH_3$ Oxidation Catalyst 16 downstream. In the $NH_3$ Oxidation Catalyst, the residual $NH_3$ is converted to $N_2$ and $H_2O$.

The Substrate

According to one or more embodiments, the substrate for the ammonia oxidation catalyst may be any of those materials typically used for preparing automotive catalysts and will typically comprise a metal or ceramic honeycomb structure. Any suitable substrate may be employed, such as a monolithic flow-through substrate and having a plurality of fine, parallel gas flow passages extending from an inlet to an outlet face of the substrate, such that passages are open to fluid flow. The passages, which are essentially straight paths from their fluid inlet to their fluid outlet, are defined by walls on which the catalytic material is coated as a "washcoat" so that the gases flowing through the passages contact the catalytic material. The flow passages of the monolithic substrate are thin-walled channels which can be of any suitable cross-sectional shape such as trapezoidal, rectangular, square, sinusoidal, hexagonal, oval, circular, etc. Such structures may contain from about 60 to about 1200 or more gas inlet openings (i.e., "cells") per square inch of cross section (cpsi). A representative commercially-available flow-through substrate is the Corning 400/6 cordierite material, which is constructed from cordierite and has 400 cpsi and wall thickness of 6 mil. However, it will be understood that the invention is not limited to a particular substrate type, material, or geometry.

The ceramic substrate may be made of any suitable refractory material, e.g., cordierite, cordierite-α alumina, silicon nitride, zircon mullite, spodumene, alumina-silica magnesia, zircon silicate, sillimanite, magnesium silicates, zircon, petalite, α alumina, aluminosilicates and the like.

The substrates useful for the bifunctional catalyst composites of embodiments of the present invention may also be metallic in nature and be composed of one or more metals or metal alloys. Exemplary metallic supports include the heat resistant metals and metal alloys such as titanium and stainless steel as well as other alloys in which iron is a substantial or major component. Such alloys may contain one or more of nickel, chromium and/or aluminum, and the total amount of these metals may comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The metallic substrates may be employed in various shapes such as corrugated sheet or monolithic form. A representative commercially-available metal substrate is manufactured by Emitec. However, it will be understood that the invention is not limited to a particular substrate type, material, or geometry. The surface of the metal substrates may be oxidized at high temperatures, e.g., 1000° and higher, to form an oxide layer on the surface of the substrate, improving the corrosion resistance of the alloy. Such high temperature-induced oxidation may also enhance the adherence of the refractory metal oxide support and catalytically-promoting metal components to the substrate.

The Catalyst Supports

According to one or more embodiments, platinum is deposited on a high surface area refractory metal oxide support. Examples of high surface area refractory metal oxides include, but are not limited to, alumina, silica, titania, ceria, and zirconia and physical mixtures or chemical combinations thereof, including atomically doped combinations. The refractory metal oxide may consist of or contain a mixed oxide such as silica-alumina, aluminosilicates which may be amorphous or crystalline, alumina-zirconia, alumina-lanthana, alumina-baria-lanthania-neodymia, alumina-chromia, alumina-baria, alumina-ceria, and the like. An exemplary refractory metal oxide comprises gamma alumina having a specific surface area of about 50 to about 300 $m^2/g$.

The zeolite component of some embodiments comprises a porous aluminosilicate onto which is deposited a metal from one of the groups VB, VIIB, VIIB, VIIIB, IB, or IIB of the periodic table. An example of these metals includes iron and copper. The zeolite component may have any one of the framework structures listed in the *Database of Zeolite Structures* published by the International Zeolite Association (IZA). The framework structures include, but are not limited to those of the CHA, FAU, BEA, MFI, and MOR types.

The platinum component of some embodiments may be supported on a zeolite, which may have any one of the framework structures listed in the *Database of Zeolite Structures* published by the International Zeolite Association (IZA). The framework structures include, but are not limited to those of the CHA, FAU, BEA, MFI, and MOR types.

The Washcoat Layer(s)

According to one or more embodiments, the catalyst is applied as a washcoat layer which is deposited upon, i.e., coated upon and adhered to, the substrate. A suitable method of preparing platinum component is to prepare a mixture or a solution of a platinum precursor in a suitable solvent, e.g. water. Generally, from the point of view of economics and environmental aspects, aqueous solutions of soluble compounds or complexes of the platinum are preferred. Typically, the platinum precursor is utilized in the form of a compound or complex to achieve dispersion of the precursor on the support. For purposes of the present invention, the term "platinum precursor" means any compound, complex, or the like which, upon calcination or initial phase of use thereof, decomposes or otherwise converts to a catalytically active form. Suitable platinum complexes or compounds include, but are not limited to platinum chlorides (e.g. salts of $[PtCl_4]^{2-}$, $[PtCl_6]^{2-}$), platinum hydroxides (e.g. salts of $[Pt(OH)_6]^{2-}$), platinum ammines (e.g. salts of $[Pt(NH_3)_4]^{2+}$, $]Pt(NH_3)_4]^{4+}$), platinum hydrates (e.g. salts of $[Pt(OH_2)_4]^{2+}$), platinum bis(acetylacetonates), and mixed compounds or complexes (e.g. $[Pt(NH_3)_2(Cl)_2]$). A representative commercially-available platinum source is 99% ammonium hexachloroplatinate from Strem Chemicals, Inc., which may contain traces of other precious metals. However, it will be understood that this invention is not restricted to platinum precursors of a particular type, composition, or purity. A mixture or solution of the platinum precursor is added to the support by one of several chemical means. These include impregnation of a solution of the platinum precursor onto the support, which may be followed by a fixation step incorporating acidic component (e.g. acetic acid) or a basic component (e.g. ammonium hydroxide). This wet solid can be chemically reduced or calcined or be used as is. Alternatively, the support may be suspended in a suitable vehicle (e.g. water) and reacted with the platinum precursor in solution. This latter method is more typical when the support is a zeolite, and it is desired to fix the platinum precursor to ion-exchange sites in the zeolite framework. Additional processing steps may include fixation by an acidic component (e.g. acetic acid) or a basic component (e.g. ammonium hydroxide), chemical reduction, or calcination.

In one or more embodiments, the washcoat layer contains a zeolite on which has been distributed a metal from one of the groups VB, VIIB, VIIB, VIIIB, IB, or IIB of the periodic table. Exemplary zeolites, include, but are not limited to zeolites having one of the following crystal structures CHA, BEA, FAU, MOR, MFI. An exemplary metal of this series is copper. A suitable method for distributing the metal on the zeolite is to first prepare a mixture or a solution of the metal precursor in a suitable solvent, e.g. water. Generally, from the point of view of economics and environmental aspects, aqueous solutions of soluble compounds or complexes of the metal are preferred. For purposes of the present invention, the term "metal precursor" means any compound, complex, or the like which, can be dispersed on the zeolite support to give a catalytically-active metal component. For the exemplary Group IB metal copper, suitable complexes or compounds include, but are not limited to anhydrous and hydrated copper sulfate, copper nitrate, copper acetate, copper acetylacetonate, copper oxide, copper hydroxide, and salts of copper ammines (e.g. $[Cu(NH_3)_4]^{2+}$). A representative commercially-available copper source is 97% copper acetate from Strem Chemicals, Inc., which may contain traces of other metals, particularly iron and nickel. However, it will be understood that this invention is not restricted to metal precursors of a particular type, composition, or purity. The zeolite can be added to the solution of the metal component to form a suspension. This suspension can be allowed to react so that the copper component is distributed on the zeolite. This may result in copper being distributed in the pore channels of the zeolite, as well as on the outer surface of the zeolite. Copper may be distributed as copper (II) ions, copper (I) ions, or as copper oxide. After the copper is distributed on the zeolite, the zeolite can be separated from the liquid phase of the suspension, washed, and dried. It may also be calcined to fix the copper.

To apply the catalyst layer to the substrate, finely divided particles of the catalyst, consisting of the platinum component and/or the metal zeolite component, are suspended in an appropriate vehicle, e.g., water, to form a slurry. Other promoters and/or stabilizers and/or surfactants may be added to the slurry as mixtures or solutions in water or a water-miscible vehicle. In one or more embodiments, the slurry is comminuted to result in substantially all of the solids having particle sizes of less than about 10 microns, i.e., between about 0.1-8 microns, in an average diameter. The comminution may be accomplished in a ball mill, continuous Eiger mill, or other similar equipment. In one or more embodiments, the suspension or slurry has a pH of about 2 to less than about 7. The pH of the slurry may be adjusted if necessary by the addition of an adequate amount of an inorganic or an organic acid to the slurry. The solids content of the slurry may be, e.g., about 20-60 wt. %, and more particularly about 35-45 wt. %. The substrate may then be dipped into the slurry, or the slurry otherwise may be coated on the substrate, such that there will be deposited on the substrate a desired loading of the catalyst layer. Thereafter, the coated substrate is dried at about 100° C. and calcined by heating, e.g., at 300-650° C. for about 1 to about 3 hours. Drying and calcination are typically done in air. The coating, drying, and calcination processes may be repeated if necessary to achieve the final desired loading of the catalyst on the support. In some cases, the complete removal of the liquid and other volatile components may not occur until the catalyst is placed into use and subjected to the high temperatures encountered during operation.

After calcining, the catalyst loading can determined through calculation of the difference in coated and uncoated weights of the substrate. As will be apparent to those of skill in the art, the catalyst loading can be modified by altering the solids content of the coating slurry and slurry viscosity. Alternatively, repeated immersions of the substrate in the coating slurry can be conducted, followed by removal of the excess slurry as described above. In a specific embodiment, the loading of the washcoat layer upon the substrate is between about 0.2 to about 3.0 g/in$^3$, or typically about 2.0 g/in$^3$.

EXAMPLES

Example 1

Preparation of a Bifunctional Ammonia Oxidation Catalyst

A typical preparation of bifunctional AMOx catalyst began with an impregnation of basic Pt(IV) precursor onto an oxide support by the incipient-wetness method. The Pt(IV) was fixed to the support by subsequent impregnation of an organic acid to decrease the surface pH and precipitate the Pt(IV). The resulting powder was then suspended in deionized water to give a slurry of approx 40% solids, and milled either by continuous mill or by standard ball mill to give a particle size distribution having 90% by particle number smaller than 10 µm. The pH was monitored and not allowed to exceed 5, to avoid resolubilization of the Pt(IV). Separately, a second component typically consisting of a transition-metal exchanged zeolite was suspended in water to give a slurry of approx 40% solids, and milled to an aggregate particle size distribution having 90% by particle number smaller than 10 µm. To this suspension was added approx 3% ZrO$_2$ (solids basis) as a solution of zirconium acetate. This was required to prevent gelation upon mixing of the two slurries. The two slurries were mixed in portions appropriate to give the required ratio of supported Pt and metal-exchanged zeolite components. The resulting slurry was analyzed for correct Pt content, and coated onto a standard cylindrical ceramic monolith having dimensions of 1.0" OD by 3.0" length, cell density of 400 cells/in$^2$, and a wall thickness of 6 mil. Coating was accomplished by dipping the monolith into the slurry parallel with the channels, removing excess slurry by air flow, and drying and calcining the resulting wet catalyst core. In some cases, repeat applications were required to obtain target loadings, particularly for total loadings>1.0 g/in$^3$. Catalyst cores were usually aged at high temperature prior to evaluation for catalyst activity. The specific aging conditions for each evaluation are described below.

Example 2

Steady State Evaluation of a Bifunctional Pt/Al$_2$O$_3$+ FeBEA Catalyst

Figure 2:
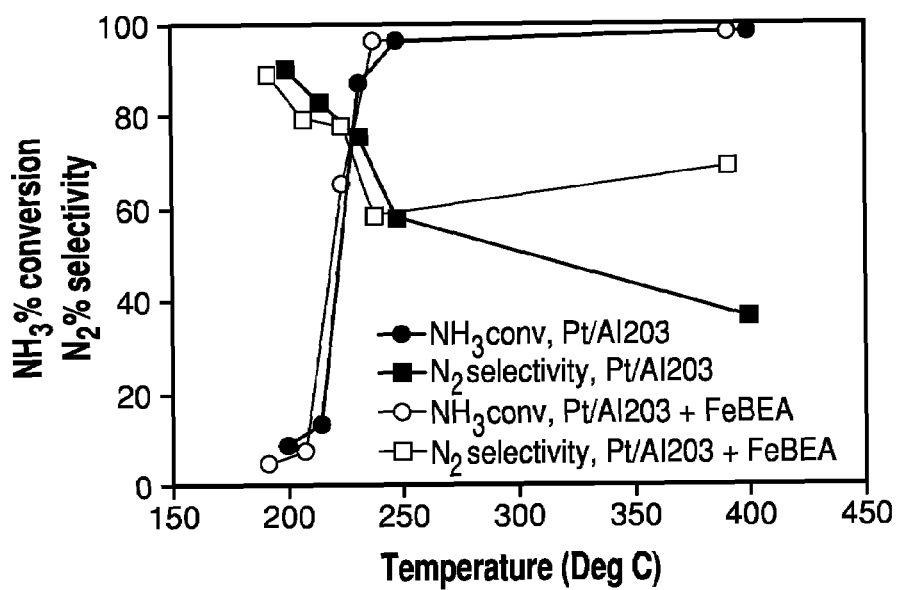
FIG. 2 shows the steady-state $NH_3$ oxidation profile for two catalysts: Closed symbols=0.57% Pt on $Al_2O_3$, catalyst loading 0.5 g/in$^3$, Pt loading 5 g/ft$^3$; Open Symbols=0.57% Pt on $Al_2O_3$, catalyst loading 0.5 g/in$^3$, Pt loading 5 g/ft$^3$+2.5 g/in$^3$ iron-exchanged beta zeolite (Fe=1.1% measured as $Fe_2O_3$, SAR=30). $NH_3$=500 ppm, NO=0, $O_2$=10% (as air), $H_2O$=5%, balance=$N_2$, GHSV=100,000/hr. Solid lines are linear interpolations between data points.

FIG. 2 shows a plot of the percent NH$_3$ conversion and percent selectivity to N$_2$ for a catalyst consisting of 0.57 wt % Pt on Al$_2$O$_3$ (0.5 g/in$^3$), giving a total Pt loading of 5 g/ft$^3$ (closed symbols). The catalyst was treated at 750° C. for 5 hr in air prior to evaluation. The data show nearly complete conversion of NH$_3$ at 250° C., but this catalyst had the undesired property of steadily decreasing N$_2$ selectivity as temperature was increased. At 400° C., the N$_2$ selectivity was only 36%, which is not likely to be suitable for vehicle application. The low selectivity at high temperature is a result of the production of considerable NO$_x$ by the supported Pt catalyst according to Eq 1. Nitric oxide is well-known to be the primary oxidation product for ammonia over supported platinum at the operative temperatures for vehicle exhaust.

$$4NH_3+5O_2 \rightarrow 4NO+6H_2O \qquad \text{Eq 1.}$$

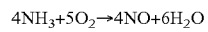

Overlaid on FIG. 2 is NH$_3$ conversion and N$_2$ selectivity data for a catalyst consisting of a mixture of 0.57 wt % Pt on Al$_2$O$_3$ (0.5 g/in$^3$) and iron-exchanged beta zeolite (2.5 g/in$^3$), (open symbols). The total catalyst loading on the monolith was 3.0 g/in$^3$. The iron content of the iron-exchanged beta zeolite was 1.1% by weight, measured as Fe$_2$O$_3$. The data in open symbols show nearly equivalent NH$_3$ conversion as for the catalyst without the iron-beta component. This was to be expected since the total loading of the supported Pt component was the same as above, and primary oxidation process over the Pt/Al$_2$O$_3$, Eq 1, is largely unaffected by the presence of the iron-beta component. However, the N$_2$ selectivity was substantially improved at high temperatures in the presence of the iron-exchanged beta zeolite component. At 400° C., the N$_2$ selectivity increased to 70% in the iron-beta containing catalyst, a two-fold improvement over the Pt/Al$_2$O$_3$ catalyst. Iron-exchanged zeolites are well-known catalysts for the comproportionation of NH$_3$ and NO to produce N$_2$ in a highly selective manner by the SCR reaction, Eq 2. This gives the means to understand the origin of the selectivity enhancement in the presence of iron beta zeolite. The supported Pt component converts NH$_3$ to NO according to Eq 1. The iron beta zeolite then functions to convert the NO intermediate to N$_2$ using an equivalent of unreacted NH$_3$, according to the stoichiometric SCR reaction in Eq 2. Based on this scheme, it is readily apparent that optimal selectivity will be obtained when the rate for Eq. 2 is competitive with or faster than the rate for Eq 1. As a result, we expected to observe a decrease in NO$_x$ production and an increase N$_2$ selectivity as the amount of the SCR component in the catalyst was increased (see example 5). These data thus illustrate the value of the bifunctional concept in designing catalysts for selective ammonia oxidation.

$$4NH_3+6NO \rightarrow 5N_2+6H_2O \qquad \text{Eq 2.}$$

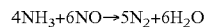

Example 3

Pulse-Ramp Testing of Ammonia Oxidation Catalysts

Figure 3:
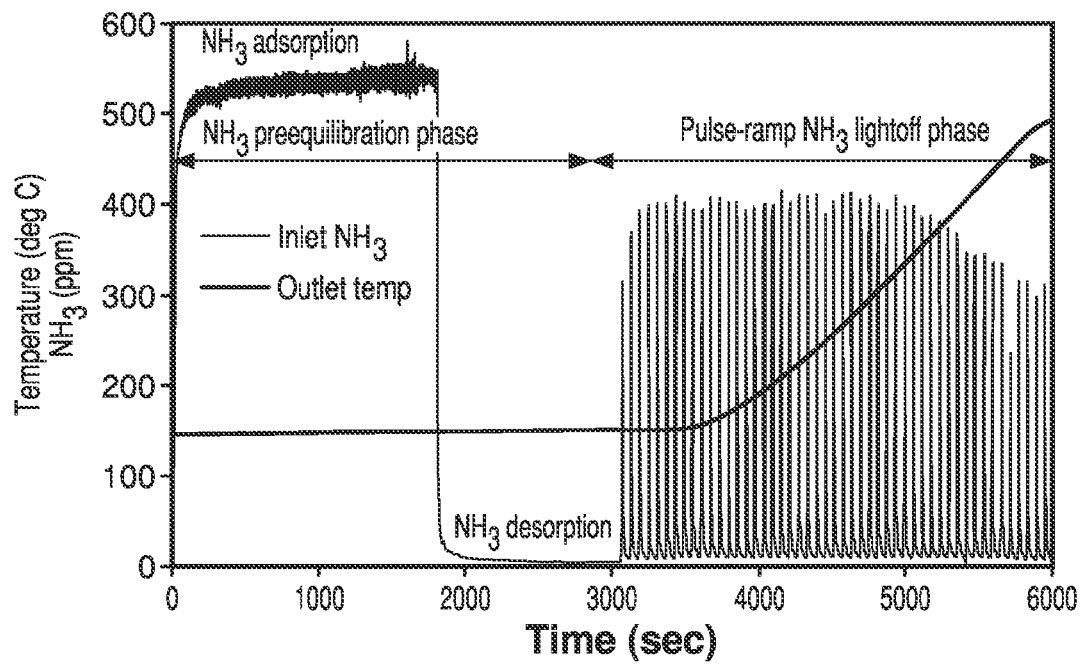
FIG. 3 shows the $NH_3$ inlet concentration profile and reactor temperature profile for the pulse-ramp $NH_3$ lightoff experiment for transient $NH_3$ oxidation evaluation. Gas composition: $O_2$=10%, $H_2O$=5%, $CO_2$=5%, balance=$N_2$, GHSV=100,000/hr.

A pulse-ramp evaluation was developed to measure the activity and selectivity of ammonia oxidation catalysts under transient conditions. These tests were run on catalysts coated onto cylindrical flow-through monoliths of dimensions 0.75" OD×2.5" length, with cell density of 400 cells/in$^2$ and a wall thickness of 6 mil. The test involved three stages. First, the catalyst was exposed for 1800 seconds to a gas stream at 150° C. containing 500 ppm ammonia, 10% dioxygen, 5% water vapor, and 5% carbon dioxide, with the balance being dinitrogen. The GHSV was 100,000/hr, based on total catalyst volume. Then the ammonia feed was turned off and the catalyst equilibrated for an additional 1200 seconds, after which there was no observable NH$_3$ in the gas phase. At this point, the temperature was increased linearly from 150° C. to 500° C. over a period of 3000 seconds. During this temperature ramp, ammonia was periodically added into the stream in 0.07 mmol pulsed, with a pulse duration of 5 seconds followed by a dwell time of 55 seconds. No ammonia was added during the dwell time. FIG. 3 illustrates this experimental ammonia profile for a blank cordierite substrate, showing the ammonia concentration during the ammonia adsorption and desorption preequilibration phase and during the pulse-ramp phase.

Example 4

Figure 4:
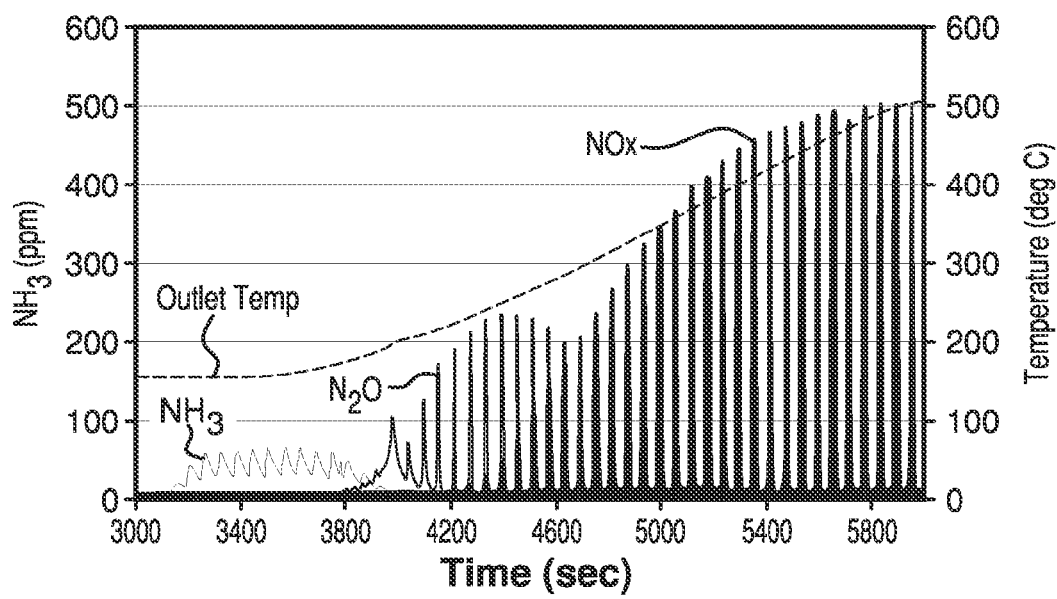
FIG. 4 shows the instantaneous emission profile for a representative bifunctional ammonia oxidation catalyst evaluated by the pulse-ramp lightoff test. Catalyst=1.8 wt % Pt on $Al_2O_3$, 1.0 g/in$^3$, Pt loading=30 g/ft$^3$+0.5 g/in$^3$ beta zeolite.

Instantaneous Emission Profiles for Typical Bifunctional Ammonia Oxidation Catalyst FIG. 4 shows a typical instantaneous emission profile for a supported platinum catalyst. This catalyst consisted of 1 g/in$^3$ SBA-150 alumina onto which was supported 30 g/ft$^3$ Pt, along with an additional 0.5 g/in$^3$ of beta zeolite. In the low-temperature region where ammonia is not consumed, the data show considerable broadening of the NH$_3$ pulses due to retention of NH$_3$ by the zeolite component. Such broadening was not observed in catalysts having no zeolite. As the temperature was increased above 200° C., the amount of NH$_3$ in the outlet decreased as NH$_3$ begins to be consumed over the catalyst. This was associated with the immediate appearance of N$_2$O in the outlet stream. N$_2$O was the primary non-N$_2$ emission observed up to 300° C., after which NO$_x$ became the most prevalent. This pattern of emissions was typical for a supported platinum catalyst containing no additional catalytic functionality. The objective of adding a second catalytic functionality to the catalyst formulation therefore was to decrease the production of NO$_x$ and/or N$_2$O.

Example 5

Figure 5:
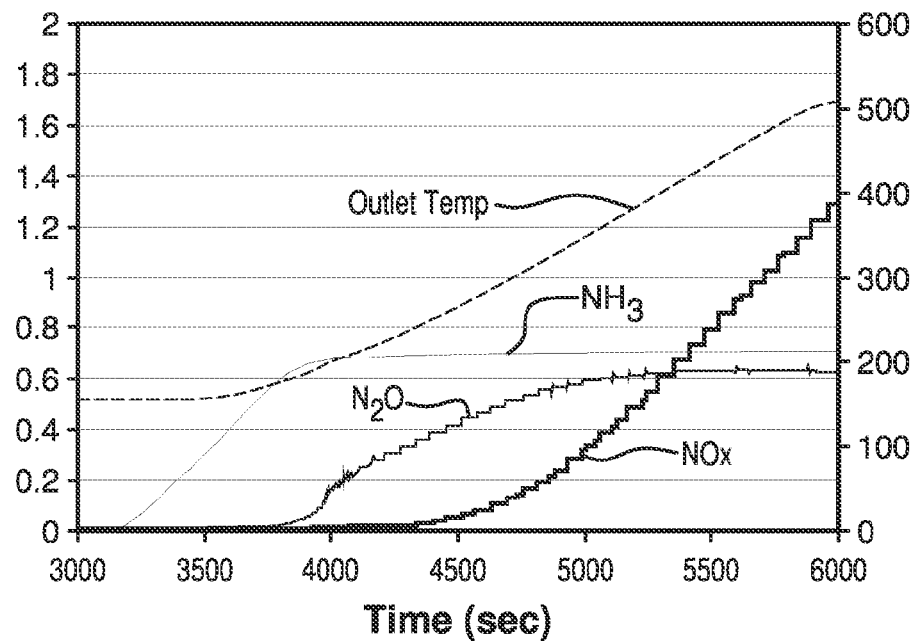
FIG. 5 shows the instantaneous emission profile for a representative bifunctional ammonia oxidation catalyst evaluated by the pulse-ramp lightoff test. Catalyst=1.8 wt % Pt on $Al_2O_3$, 1.0 g/in$^3$, Pt loading=30 g/ft$^3$+0.5 g/in$^3$ beta zeolite.

Cumulative Emission Data for a Representative Bifunctional Ammonia Oxidation Catalyst Integration of the instantaneous emission data in FIG. 4 gave the cumulative emission profile for ammonia oxidation shown in FIG. 5. The catalyst part was the same as for Example 3. The inflection in the NH$_3$ profile between 200° C. and 250° C. indicates the lightoff region and the flat line for NH$_3$ above 250° C. indicates no ammonia emission above this temperature. The data clearly shows the onset of N$_2$O production at 225° C., and the onset of NO$_x$ production at 300° C. Using the integrated data, the net emission of each N-containing species over the duration of the test was determined, with the exception of N$_2$. Net dinitrogen production was determined from a mass balance calculation, assuming that the only products of NH$_3$ oxidation are N$_2$, NO, NO$_2$, and N$_2$O. Catalytic selectivities for each species were calculated as the ratio of the total emission of that species to the total NH$_3$ converted.

Example 6

Figure 6:
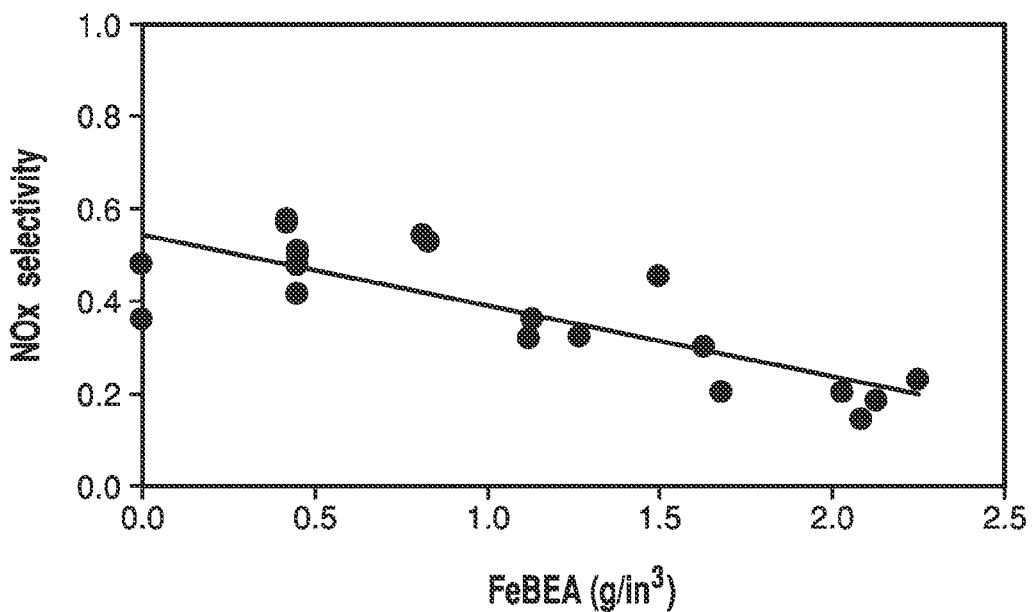
FIG. 6 shows the selectivity to $NO_x$ (=$NO+NO_2$) for a series of bifunctional ammonia oxidation catalysts having different levels of iron-exchanged beta zeolite in the catalyst, evaluated by the pulse-ramp lightoff test. Solid line is a linear least-squares fit to the data.

NO$_x$ Selectivity as a Function of Iron Beta Content for Bifunctional Ammonia Oxidation Catalysts Based on Supported Platinum and Iron Beta Zeolite FIG. 6 shows a plot of the net selectivity of the catalyst to NO$_x$ production as a function of the content of iron beta zeolite in the catalyst composition. The compositions of the catalysts used to generate FIG. 6 are provided in Table 1. FIG. 6 shows data for Pt supported on alumina SBA-150, on a silica-alumina Siralox 1.5, and on a titania INE 108. For all of these samples the general trend was to produce lower levels of NO$_x$ species as the content of iron beta zeolite is increased.

TABLE 1

| Catalyst ID | Pt g/ft3 | metal oxide | metal oxide loading g/in3 | FeBEA loading g/in3 | Part loading g/in3 |
|---|---|---|---|---|---|
| A1 (blank control) | 0.00 | none | 1.00 | 0.00 | 1.00 |
| A2 (blank control) | 0.00 | none | 1.00 | 0.00 | 1.00 |
| A3 | 5 | Al$_2$O$_3$/CeO$_2$ | 2.44 | 0 | 2.44 |
| A4 | 30 | SBA-150 | 1 | 0.5 | 1.50 |
| A5 | 6.1 | Siralox1.5 | 0.45 | 0.45 | 0.90 |
| A6 | 10 | Siralox1.5 | 0.83 | 0.83 | 1.66 |
| A7 | 10.00 | Siralox1.5 | 0.83 | 2.25 | 3.08 |
| A8 | 6.10 | Siralox1.5 | 0.45 | 0.45 | 0.90 |
| A9 | 6.10 | Siralox1.5 | 0.45 | 0.45 | 0.90 |
| A10 | 6.10 | Siralox1.5 | 0.45 | 0.45 | 0.90 |
| A11 | 6.10 | Siralox1.5 | 0.45 | 0.45 | 0.90 |
| A12 | 90 | Siralox1.5 | 2.05 | 0 | 2.05 |
| A13 | 27.00 | Siralox1.5 | 0.38 | 1.27 | 1.65 |
| A14 | 26.00 | Siralox1.5 | 0.38 | 1.63 | 2.01 |
| A15 | 28 | Siralox1.5 | 0.98 | 1.3 | 2.28 |
| A16 | 25.00 | INE108 | 0.35 | 1.13 | 1.48 |
| A17 | 26.40 | INE108 | 0.38 | 1.68 | 2.06 |
| A18 | 25.00 | INE108 | 0.35 | 1.12 | 1.47 |
| A19 | 25.00 | INE108 | 0.35 | 2.08 | 2.43 |
| A20 | 25.00 | INE108 | 0.35 | 2.03 | 2.38 |
| A21 | 28.00 | INE108 | 0.75 | 2.13 | 2.88 |
| A22 | 5.3 | FeBEA | 0.42 | 0.42 | 0.84 |
| A23 | 10 | FeBEA | 0.81 | 0.81 | 1.62 |
| A24 | 5.30 | FeBEA | 0.42 | 0.42 | 0.84 |

Example 7

Figure 7:
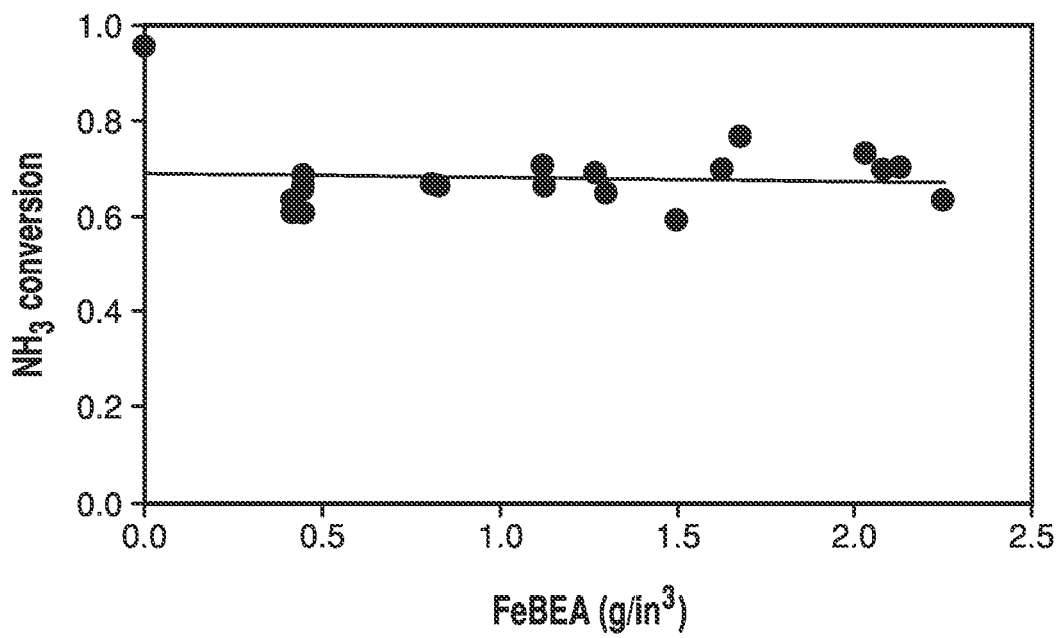
FIG. 7 shows the fractional conversion of ammonia as a function of the amount of iron-exchanged beta zeolite in the catalyst, for a series of bifunctional ammonia oxidation catalysts, evaluated by the pulse-ramp lightoff test. Solid line is a linear least-squares fit to the data.

Ammonia Conversion as a Function of Iron Beta Content for Bifunctional Ammonia Oxidation Catalysts Based on Supported Platinum and Iron Beta Zeolite It is important to demonstrate that the two functions in the bifunctional ammonia oxidation catalyst are kinetically independent, so that the activity of each component is not negatively affected by the other. Iron beta zeolite is not an effective catalyst itself for oxidation of ammonia by Eq 1, and so the net ammonia conversion is dominated by the supported platinum component. This is clearly demonstrated in FIG. 7 which shows that the ammonia conversion, and hence the rate for ammonia oxidation, was not affected by the amount of iron beta zeolite in the sample. The iron beta component did not contribute strongly to ammonia oxidation, but neither did it inhibit lightoff of ammonia oxidation over the supported platinum component. Data also showed that the iron beta component did not influence the $N_2O$ production, which was consistent with the observation that iron-based catalysts do not react with $N_2O$ below 400° C. This reinforces the kinetic independence of the supported platinum component and the iron beta component.

Example 8

Steady State Evaluation of a Bifunctional $Pt/Al_2O_3$ + CuCHA Catalyst

Figure 8:
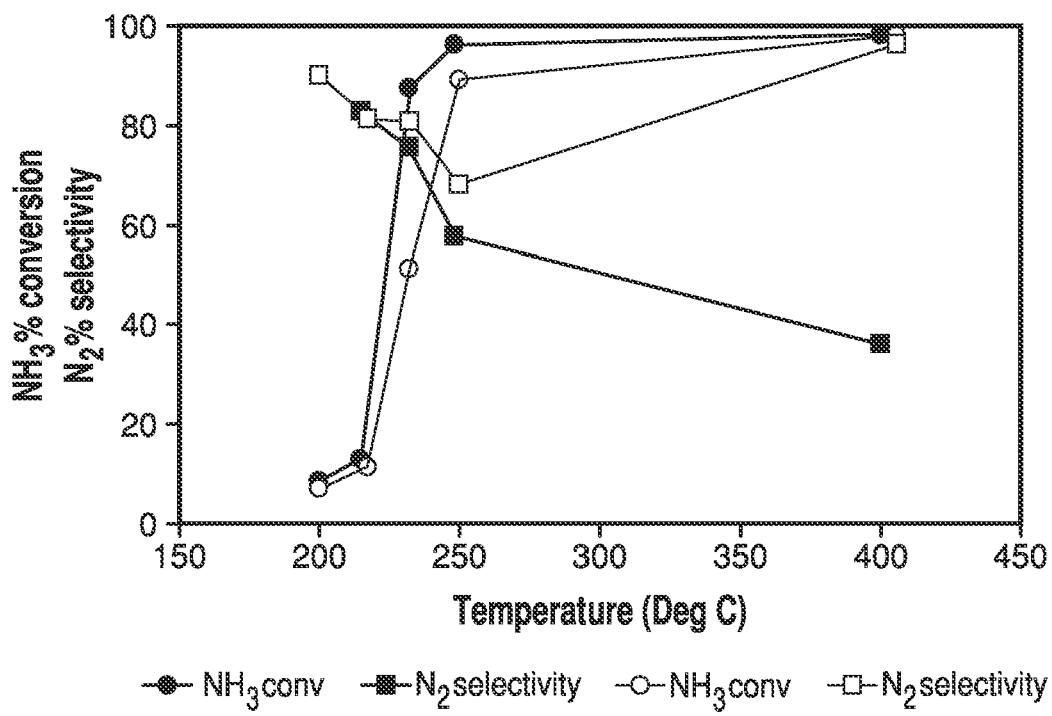
FIG. 8 shows the steady-state $NH_3$ oxidation profile for two catalysts: Closed symbols=0.57% Pt on $Al_2O_3$, catalyst loading 0.5 g/in$^3$, Pt loading 5 g/ft$^3$; Open Symbols=0.57% Pt on $Al_2O_3$, catalyst loading 0.5 g/in$^3$, Pt loading 5 g/ft$^3$+copper-exchanged chabazite, catalyst loading=2.5 g/in$^3$ (Copper=2.5% measured as CuO, SAR=30). $NH_3$=500 ppm, NO=0, $O_2$=10% (as air), $H_2O$=5%, balance=$N_2$, GHSV=100,000/hr. Solid lines are linear interpolations between data points.

The scheme embodied in FIGS. 1 and 2 suggest that the selectivity to $N_2$ can be increased by increasing the amount of the SCR active component, or by using an intrinsically more active SCR component. This latter strategy was illustrated by the preparation of a catalyst containing 0.57 wt % Pt on $Al_2O_3$ (0.5 g/ft$^3$ loading) and a copper exchanged chabazite zeolite (CuCHA, 2.5 g/ft$^3$ loading) to give a total catalyst loading of 3.0 g/in$^3$. The total loading of supported Pt component was identical to that in Example 2, (5 g/ft$^3$ Pt). The catalyst was aged at 750° C. for 5 hr in air. The catalyst was evaluated under steady-state $NH_3$ oxidation conditions. The $NH_3$ conversion and $N_2$ selectivity were plotted as open symbols in FIG. 8, along with the supported Pt-only control sample in closed symbols. As in Example 2, the $NH_3$ conversion was similar for the catalyst with and without the CuCHA component. However, the $N_2$ selectivity was substantially higher for the catalyst containing CuCHA, relative to the control sample, and was also higher than the sample containing FeBEA. At 400° C., the catalyst converts 100% of the $NH_3$ to $N_2$ and there was essentially no formation of $NO_x$, whereas the FeBEA-containing catalyst produces approx 30% $NO_x$ at 400° C. This is consistent with the independent observation that CuCHA is a much more active catalyst for the SCR reaction than is the FeBEA.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A method for treating emissions produced in the exhaust gas stream of a diesel or lean-burn vehicle, the method comprising: passing a vehicle's engine exhaust stream through at least a $NO_x$ abatement catalyst composition; and passing the exhaust stream exiting the $NO_x$ abatement catalyst composition and possibly containing ammonia through a bifunctional oxidation catalyst composition effective for oxidizing ammonia, the bifunctional oxidation catalyst composition comprising a first catalyst for catalyzing the oxidation of ammonia, the first catalyst consisting essentially of platinum supported on a refractory metal oxide selected from alumina, silica, zirconia, titania, and physical mixtures or chemical combinations thereof, including atomically doped combinations, and a second catalyst for improving $N_2$ selectivity, the second catalyst comprising a second metal from one of the groups VB, VIB, VIIB, VIIIB, IB, or IIB of the periodic table supported on a zeolite.

2. The method of claim 1 wherein the $NO_x$ abatement catalyst composition comprises an SCR catalyst, an LNT catalyst, or other catalyst for the destruction of $NO_x$ that results in slippage of ammonia from the $NO_x$ abatement catalyst.

3. The method of claim 1 wherein the $NO_x$ abatement catalyst composition and oxidation catalyst composition are disposed on separate substrates.

4. The method of claim 1 wherein the $NO_x$ abatement catalyst composition and the oxidation catalyst are disposed on the same substrate.

5. The method of claim 1 wherein the refractory metal oxide is alumina.

6. The method of claim 1 wherein platinum is distributed on the zeolite.

7. The method of claim 1 wherein platinum is present in an amount in the range of about 0.1 g/ft$^3$ to about 10 g/ft$^3$, based on total catalyst volume.

8. The method of claim 1 wherein the metal from one of the groups VB, VIB, VIIB, VIIIB, IB, or IIB of the periodic table is present on the zeolite in an amount between 0.1% and 5% by wt of zeolite.

9. The method of claim 1 wherein the metal from one of the groups VB, VIB, VIIB, VIIIB, IB, or IIB of the periodic table is copper.

10. The method of claim 1 wherein the metal from one of the groups VB, VIB, VIIB, VIIIB, IB, or IIB of the periodic table is iron.

11. The method of claim 1 wherein the total loading of the refractory metal oxide support on the substrate is between about 0.01 g/in$^3$ and 2.0 g/in$^3$, based on total catalyst volume.

12. The method of claim 1 wherein the zeolite has one of the following crystal structures: CHA, BEA, FAU, MOR, MFI.

13. The method of claim 1 wherein the mole ratio of silica to alumina in the zeolite is from about 2 to about 250.

14. The method of claim 1 wherein the total loading of the zeolite on the substrate is between about 0.1 g/in$^3$ and 4.0 g/in$^3$, based on total catalyst volume.

15. The method of claim 1 wherein the bifunctional oxidation catalyst composition has N$_2$ selectivity in excess of about 60% between 250° C. and 400° C.

16. A bifunctional catalyst composition effective for oxidizing ammonia, comprising a first catalyst for catalyzing the oxidation of ammonia consisting essentially of platinum supported on a refractory metal oxide selected from alumina, silica, zirconia, titania, and physical mixtures or chemical combinations thereof, including atomically doped combinations, and a second catalyst for improving N$_2$ selectivity, the second catalyst comprising a second metal from one of the groups VB, VIB, VIIB, VIIIB, IB, or IIB of the periodic table distributed on a zeolite.

17. The catalyst composition of claim 16 wherein the refractory metal oxide is selected from alumina.

18. The catalyst composition of claim 16 wherein platinum is distributed on the zeolite.

19. The catalyst composition of claim 16 wherein platinum is present in an amount in the range of about 0.1 g/ft$^3$ to about 10 g/ft$^3$, based on total catalyst volume.

20. The catalyst composition of claim 16 wherein the metal from one of the groups VB, VIB, VIIB, VIIIB, IB, or IIB of the periodic table is present on the zeolite in an amount between 0.1% and 5% by wt of zeolite.

21. The catalyst composition of claim 16 wherein the metal from one of the groups VB, VIB, VIIB, VIIIB, IB, or IIB of the periodic table is copper.

22. The catalyst composition of claim 16 wherein the metal from one of the groups VB, VIB, IIB, VIIIB, IB, or IIB of the periodic table is iron.

23. The catalyst composition of claim 16 wherein the total loading of the refractory metal oxide support on the substrate is between about 0.01 g/in$^3$ and 2.0 g/in$^3$, based on total catalyst volume.

24. The catalyst composition of claim 16 wherein the zeolite has one of the following crystal structures: CHA, BEA, FAU, MOR, MFI.

25. The catalyst composition of claim 16 wherein the mole ratio of silica to alumina in the zeolite is from about 4 to about 250.

26. The catalyst composition of claim 16 wherein the total loading of the zeolite on the substrate is between about 0.1 g/in$^3$ and 4.0 g/in$^3$, based on total catalyst volume.

27. The bifunctional oxidation catalyst composition of claim 16 having N$_2$ selectivity in excess of about 60% between 250° C. and 400° C.

28. A treatment system for an exhaust stream containing NO$_x$, the system comprising: at least one upstream NO$_x$ abatement catalyst composition effective for decreasing NO$_x$; and a downstream bifunctional oxidation catalyst composition effective for removing ammonia, the bifunctional oxidation catalyst composition comprising a first catalyst for catalyzing the oxidation of ammonia consisting essentially of platinum supported on a refractory metal oxide selected from alumina, silica, zirconia, titania, and physical mixtures or chemical combinations thereof, including atomically doped combinations, and a second catalyst for improving N$_2$ selectivity, the second catalyst comprising a second metal from one of the groups VB, VIB, VIIB, VIIIB, IB, or IIB of the periodic table supported on a zeolite.

29. The treatment system of claim 28 wherein the NO$_x$ abatement catalyst composition comprises an SCR catalyst, an LNT catalyst, or other catalyst for the destruction of NO$_x$ that results in slippage of ammonia from the NO$_x$ abatement catalyst.

30. The treatment system of claim 28 wherein the NO$_x$ abatement catalyst composition and oxidation catalyst composition are disposed on separate substrates.

31. The treatment system of claim 28 wherein the NO$_x$ abatement catalyst composition and the oxidation catalyst composition are disposed on the same substrate.

32. The treatment system of claim 28 comprising a metering system for metering ammonia or an ammonia precursor into the exhaust stream.

33. The treatment system of claim 28 wherein the bifunctional oxidation catalyst composition has N$_2$ selectivity in excess of about 60% between 250° C. and 400° C.

* * * * *